United States Patent [19]

Merkle

[11] Patent Number: 5,003,597

[45] Date of Patent: Mar. 26, 1991

[54] METHOD AND APPARATUS FOR DATA ENCRYPTION

[75] Inventor: Ralph C. Merkle, Sunnyvale, Calif.

[73] Assignee: Xerox Corporation, Rochester, N.Y.

[21] Appl. No.: 454,204

[22] Filed: Dec. 21, 1989

[51] Int. Cl.$^5$ .............................................. H04K 1/04
[52] U.S. Cl. ...................................... 380/37; 380/28; 380/29
[58] Field of Search ....................... 380/28, 29, 36, 37, 380/42, 46, 47, 50

[56] References Cited

U.S. PATENT DOCUMENTS

| | | | |
|---|---|---|---|
| 3,958,081 | 5/1976 | Ehrsam et al. | 380/29 |
| 3,962,539 | 6/1976 | Ehrsam et al. | 380/29 |
| 4,275,265 | 6/1981 | Davida et al. | 380/29 |
| 4,465,901 | 8/1984 | Best | 380/4 |

FOREIGN PATENT DOCUMENTS 8801119 2/1988 World Int. Prop. O. ............ 380/29

OTHER PUBLICATIONS

Conference 1981 International Conference on Communications Denver Co. U.S.A. (14-18 Jun. 1981), S. Banerjee; IEEE 380/29.

Primary Examiner—Thomas H. Tarcza
Assistant Examiner—Tod Swann
Attorney, Agent, or Firm—Townsend and Townsend

[57] ABSTRACT

A method and apparatus for encrypting and decrypting data which operates efficiently on computers of differing architectures is disclosed. Unlike previous encryption/decryption method and apparatus, the present invention executes efficiently in the computer's software. The method uses part of the data input to access a table of pseudo-random numbers. The pseudo-random numbers are exclusively ORed (XORed) with the remaining part of the data input. The output from the XOR operation is then used to access the table where the other portion of the data is in turn XORed with the pseudo random numbers. This iterative process continues until the data is fully randomized. Several variations of this method are presented.

27 Claims, 4 Drawing Sheets

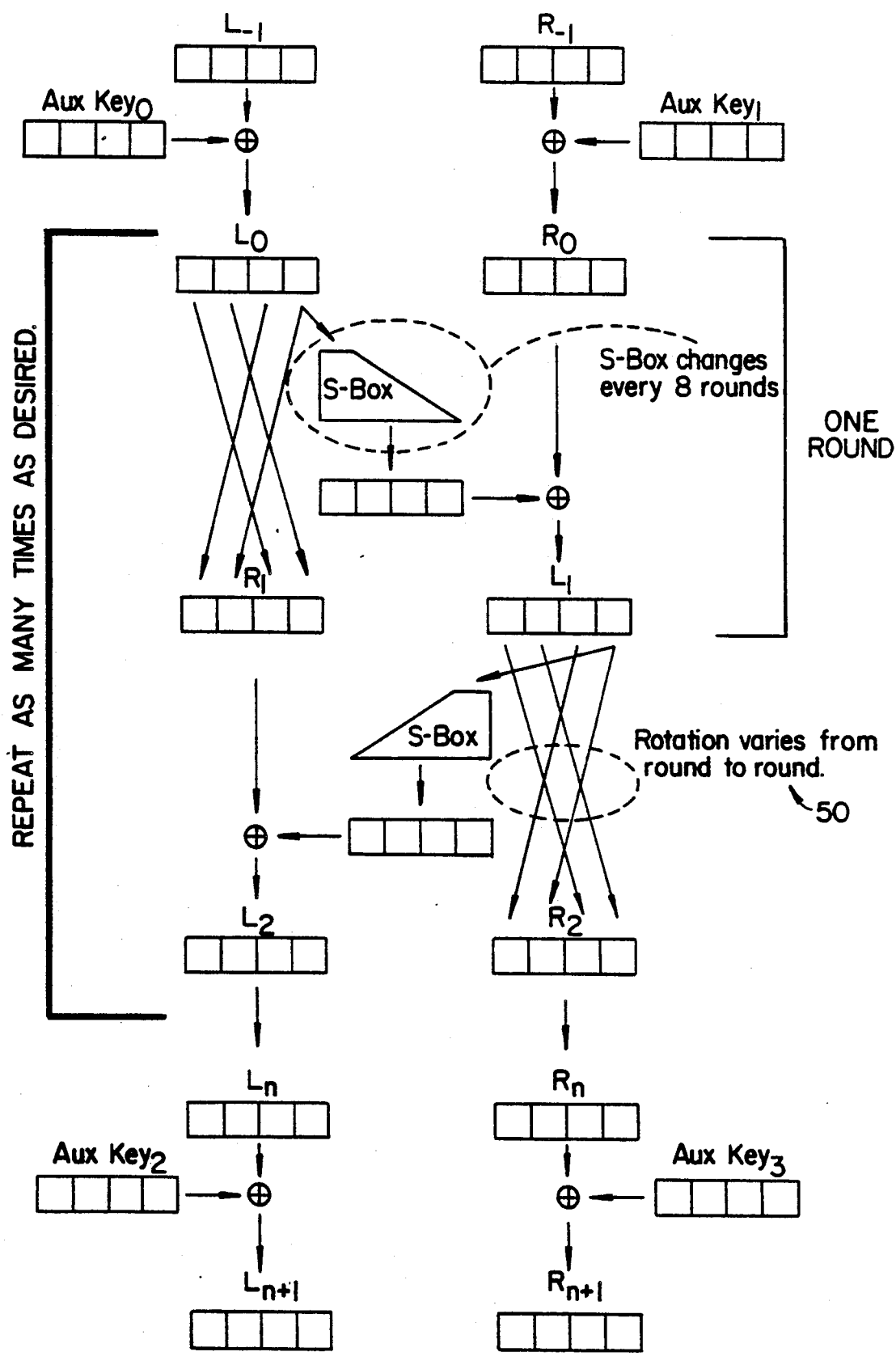
FIG._1.

```
-- L[-1] STARTS WITH LEFT 32 BITS OF PLAINTEXT
-- R[-1] STARTS WITH RIGHT 32 BITS OF PLAINTEXT

-- EXCLUSIVE OR THE INPUT WITH "RANDOMIZING" VALUES
L[0] = L[-1] XOR AuxiliaryKeys[0];
R[0] = R[-1] XOR AuxiliaryKeys[1];

OCTET = 1;
FOR ROUND = 1 TO N DO  /* N OF 16 IS TYPICAL */
    BEGIN
            -- COMPUTE THE INDEX BY TAKING
            -- THE BOTTOM 8 BITS OF L FROM THE LAST ROUND
        i[round] = L[round-1] AND #FF -- XOR R FROM THE LAST ROUND WITH THE S-BOX
               ENTRY
            -- SELECTED BY i (THE INDEX VALUE), FOR THIS
               ROUNDS L
        L[round] = R[round-1] XOR SBoxes[octet][i[round]];

-- ROTATE L FROM THE LAST ROUND TO COMPUTE
            -- THE R OF THIS ROUND
        R[round] = RotateRight[L[round-1],
                 rotateSchedule[(round-1) mod 8 + 1] ];

-- SELECT A NEW S-BOX EVERY 8 ROUNDS
        if (round mod 8 = 0) then octet = octet + 1;
    END;

-- EXCLUSIVE OR THE OUTPUT WITH "RANDOMIZING" VALUES
L[N+1] = L[N] XOR AuxiliaryKeys[2];

R[N+1] = R[N] XOR AuxiliaryKeys[3];
```

FIG._2.

| INDEX VALUE (8 BITS) | ENTRY VALUE (32 BITS) | | | |
|---|---|---|---|---|
| ROW: | COLUMN: | | | |
|  | 0 | 1 | 2 | 3 |
| 0 | 64 | F9 | 00 | 1B |
| 1 | FE | DD | CD | F6 |
| 2 | 7C | 8F | F1 | E2 |
| 3 | 11 | D7 | 15 | 14 |
| 4 | 8B | 8C | 18 | D3 |
| 5 | DD | DF | 88 | 1E |
| 6 | 6E | AB | 50 | 56 |
| 7 | 88 | CE | D8 | E1 |
| 8 | 49 | 14 | 89 | 59 |
| 9 | 69 | C5 | 6F | D5 |
| 10 | B7 | 99 | 4F | 03 |
| 11 | 0F | BC | EE | 3E |
| 12 | 3C | 26 | 49 | 40 |
| 13 | 21 | 55 | 7E | 58 |
| 14 | E1 | 4B | 3F | C2 |
| 246 | 08 | 96 | AA | 49 |
| 247 | 42 | 23 | 36 | 81 |
| 248 | F6 | 2C | 55 | CB |
| 249 | 9F | 1C | 54 | 04 |
| 250 | F7 | 4F | B1 | 5C |
| 251 | C0 | 6E | 43 | 12 |
| 252 | 6F | FE | 5D | 72 |
| 253 | 8A | A8 | 67 | 8B |
| 254 | 33 | 7C | D1 | 29 |
| 255 | 82 | 11 | CE | FD |

FIG._3.

```
/* THIS ROUTINE GENERATE THE INITIAL S BOX
   FROM THE RAND TABLE OF RANDOM NUMBERS */

/* THE ROUTINE "randomInRange(a,b)" GENERATES A RANDOM NUMBER
   IN THE RANGE FROM a TO b, INCLUSIVE. IT DOES SO BY
   USING THE RAND TABLE. */

BEGIN

ROW: [0..255];

/* THERE ARE 4 "COLUMNS" IN A 32-BIT WORD.
        EACH COLUMN IS ONE BYTE. */
  COLUMN:[0..3];

/*FILL INITIAL S BOX WITH A TRIVIAL PERMUTATION
       THAT MAPS 0 TO 0, 1 TO 1, ETC. */

FOR ROW = 0 TO 255 DO
    FOR COLUMN = 0 TO 3 DO
      initialSBox[row][column] = row;

/* RANDOMLY PERMUTE EACH COLUMN */

FOR COLUMN = 0 TO 3 DO
    BEGIN
      FOR ROW = 0 TO 254 DO
          /* SWAP TWO BYTES IN A COLUMN.
             THUS, THE COLUMN REMAINS A PERMUTATION */
      swapBytes(
          initialSBox[row,                              column],
          initialSBox[randomInRange(row, 255),          column]
          );
    End;
End;
```

FIG._4.

METHOD AND APPARATUS FOR DATA ENCRYPTION

FIELD OF THE INVENTION

This invention relates to data encryption and decryption. More specifically, it relates to computer programs used to encrypt and decrypt binary data.

BACKGROUND OF THE INVENTION

The necessity of coding information prior to transmission over public channels or through public media is well known. Although the military has historically been the driving force behind the development of coding and decoding methods and apparatus, the growing use of computer networks in commercial fields, with confidential corporate data being transmitted over unsecured transmission lines, has created the need for a commercially available system which will be capable of encrypting and decrypting data at high speeds.

One commonly used method to encrypt and decrypt data is the Data Encryption Standard ("DES") announced by the Federal government in January 1977 (Federal Information Processing Standards Publication, January 16, 1977) and originally created by IBM. That algorithm for encrypting and decrypting binary information is incorporated herein DES relies heavily on permutations of the inputted data and various "S-boxes" In DES and in this application an "S-Box" is used as an abbreviation of "Substitution Box". In such boxes, a number of preselected length is used to enter the "S-box" and a number of preselected length is outputted. Each number in a DES S-Box is carefully chosen to help randomize the data. Faster implementations of DES implement permutations by table look-ups using several bits simultaneously. In these implementations, the 32-to-32 bit permutation P which comprises an important part of the DES algorithm is effected by looking up several bits at the same time in a table. This permutation is often merged with the preceding S-box lookup. Each individual S-box in DES provides only 64 entries of 4 bits each, or 32 bytes per S-box. DES uses 8 S-boxes realized in hardware and operating in parallel to look up 8 different values simultaneously. Although this type of operation can be performed efficiently with parallel memory hardware, when and if the algorithm is "realized" in software on a conventional sequential processor, the table look-ups must occur serially, making DES exceedingly cumbersome and slow.

Another problematic aspect of DES is that the criteria used to design the S-boxes have been kept secret. Although no reason exists to believe that the S-boxes conceal a "trap door" which would enable the creators of DES to decipher DES encoded messages, it would be preferable to have a system wherein the criteria for S-box selection are made explicitly.

Finally, the size of the key used in DES has been criticized as being too small (only 56 bits) and the key schedule has been criticized as for not providing adequate key mixing.

There is therefore a need for a data encryption/decryption method and apparatus which executes efficiently in software, which uses known criteria for selecting its S-boxes, and which precomputes the key.

SUMMARY OF THE INVENTION

Two methods for encrypting and decrypting data are described herein. The first performs fast encryption of large amounts of data. To achieve high speed, the S-boxes used in the encryption process are precomputed. The second method involves no precomputation and is used to encrypt small amounts of data. Both methods provide a method and apparatus for data encryption and decryption which is optimized for high speed implementation as software, which uses a publicly revealed method to generate its S-boxes and which uses a key size which insures full data security.

The first method is similar to DES in that it is a multiround encryption function in which the original 64-bit clear text is divided into two 32-bit halves (called L and R for Left and Right) which are used alternately in the computations. Each half is used as input to a function F, which will be described later, whose output is exclusive ORed ("XORed") with the other half. The two halves are then exchanged and the calculations repeated until the pattern generated thereby appears to be completely random. Unlike DES, which uses an F function defined by 8 table lookups and the permutations associated therewith, this method uses a single table lookup in a larger S-box. This larger S-box is precomputed.

The second method differs from the first in that the S-box is not precomputed. Instead, a standard S-box is used. Although this requires a separate mechanism to mix in key material as the standard S-box cannot serve as the key, this mechanism is simple—key material is XORed with the 64-bit clear text data block before the first round and thereafter following every 8 rounds.

Both methods operate much more efficiently than DES when implemented as software, the design of their S-boxes is public, and the key mixing scheme is sufficiently complex to provide proper data security.

BRIEF DESCRIPTION OF THE DRAWINGS

FIG. 1 is a flow-chaft of the first method for data encryption and decryption;

FIG. 2 shows the encryption/decryption algorithm of FIG. 1 in a notationally clearer form;

FIG. 3 is an example of an S-box; and

FIG. 4 shows the method whereby the standard S-box is created.

Appendix A comprises a listing of a C language computer program which performs the claimed invention.

DETAILED DESCRIPTION OF THE PREFERRED EMBODIMENT

The basic encryption/decryption method is shown in FIG. 1. Data is processed in 64-bit clear text blocks. The initial 64-bit clear text block is split in half, creating an initial left half $L_{-1}$ of 32 bits and an initial right half $R_{-1}$ of 32 bits. $L_{-2}$ and $R_{-1}$ are XORed with a 32-bit Auxiliary Key 0 and 32 bit Auxiliary Key 1, respectively. This preliminary operation has the effect of thwarting certain subtle types of "code breaking" attacks, especially those attacks where there is some knowledge of the data being transmitted. The output from this operation is an initial left half $L_0$ and an initial right half $R_0$, respectively, each 32 bits in length.

The main body of the encryption method begins with the rightmost eight bits of $L_0$ being used as input to an S-box. The output from the S-box is a 32 bit entry which is then XORed with $R_0$. $L_0$, which was unchanged by its use to access the S-box, is then rotated according to a predefined rotation schedule. After its rotation, the 32-bit word is labeled $R_1$ and used as the right half input in the next iteration of the encryption method. The output from the XOR operation of $R_0$ and the S-box entry is labeled $L_1$ and used as the left half input in the next iteration of the encryption method.

This simple process is the basic building block of the encryption method. In each succeeding round the output of the XOR operation is used in the same manner as $L_0$ was initially—its rightmost 8 bits are used to access the S-box, the output of the S-box is XORed with the current right side 32-bit word and the result labeled as the new left half, the current left half is rotated, becoming the right half and the process repeats. The successive Rs are in turn formed using the rotation schedule as applied to the previous L. Successive iterations continue to operate on the data in the described manner until the pattern of the data, as seen in the output, approaches complete apparent randomness. The method, unlike DES, uses only one table lookup in a large S-box for each round.

In this first method, one S-box is used for each 8 rounds of the encryption process. The S-box contains 256 32-bit units. Each 8-bit byte in the inputted 64-bit clear text unit accesses the S-box once. After these 8 accesses are completed, a new S-box is selected. Thus, for each 16 rounds of the method, 2 S-boxes are required. This method of rotating the 8-bit bytes in the "left" unit and requiring a new S-box every 8 rounds eliminates the possibility that the same 32-bit unit from a given S-box will be used twice in an XOR operation. If such a double usage or "self cancellation" occurred, it would effectively reduce the number of encryption rounds by 2 each time a 32-bit unit was used a second time.

The process runs for a preselected number of iterations until an acceptable level of randomness (security) is obtained. For most commercial applications, 16 rounds is believed to be adequate. For 16 rounds, 2 pre-computed S-boxes are required. Obviously, for greater security additional rounds of the process could be performed. For such additional rounds, 1 additional S-box would need to be precomputed for every 8 additional rounds. This improves the encryption, as it prevents self-cancellation and also results in more bits in the S-boxes influencing the bits in the output.

After the desired number of rounds is completed, a final XOR operation is performed using the final left and right 32-bit data blocks and 32-bit auxiliary keys 2 and 3.

The data encryption method just described is a block cipher on 64-bit clear text blocks. 64-bit blocks were chosen to conform with DES's 64-bit size. This permits the substitution of this new encryption method for DES with a minimum of difficulty.

The method just described is shown in a notationally clearer form in FIG. 2. The various variables have been indexed to facilitate tracking them through the successive iterations by re-writing the method shown in FIG. 1 in an array format wherein L and R are treated as arrays. The array "i" is added to denote the indices used to access the S-box. As shown in FIG. 2, the plain text is, by definition, denoted $L[-1]$ and $R[-1]$ and the ciphertext is $L[N+1]$ and $R[N+1]$. Also by definition, round 1 computes $L[1]$ and $R[1]$ from $L[0]$ and $R[0]$, using index 1, or $i[1]$.

As discussed earlier, the purpose of the rotation schedule (step 50) is to bring new bytes of the input into position so that all 8 bytes of input are used in the first 8 rounds. Thus, any given single change in any single input byte is guaranteed to force a different S-box selection within 8 rounds. This forced change in turn initiates the cascade of unpredictable changes needed to encode the input. A secondary purpose of using rotation to select different bytes as opposed to some other method is to maximize the number of rotates by 16 used to perform this method as such "Rotates" tend to run faster on most microprocessors. For example, the Motorola 68000 has a SWAP instruction which is equivalent to rotating a 32-bit register by 16 bits. Also, rotation by 16 tends to be very fast on microprocessors with 16 bit registers. Indeed, by switching one's viewpoint about which register contains the lower 16-bits and which contains the upper 16 bits, it is possible to perform this operation with no instruction at all.

Both the first and second method described herein can be implemented efficiently on different computer architectures. The methods function equally well regardless of whether the computer supports shift instructions (either left/right shifts), or rotate instructions. Generally, the most efficient implementation of these methods will be achieved by preselecting either shift or rotate instructions, depending upon which instruction is supported by the computer. However, if the computer is equipped with a very sophisticated compiler, these methods will be translated into lower level code using the instruction supported by the particular machine without affecting the result computed by the method. This feature is called architectural invariance.

The parameter 'N' is used because encryption must continue for enough rounds to obscure and conceal the data. It is left as a parameter so that users who wish greater security can require more rounds, while those who are satisfied with fewer rounds can encrypt and decrypt data more rapidly. A minimum of 8 rounds and a maximum of 64 are considered reasonable. Typical applications will use 16, 24 or 32 rounds. For reasons of implementation efficiency, values of 'N' that are not multiples of 8 are not acceptable.

The computation of the S-box is obviously important to the encryption/decryption method. FIG. 3 shows an S-box comprised of 4 columns and 256 rows, each entry in the rows being 8 bits wide.

Unlike DES no explicit step for mixing in key material is used as the entire S-box is pre-computed from a user-supplied key. The key is presumed to be relatively short. Although S-box generation is complex, its essential idea is simple. The S-box is generated in a pseudo-random fashion from a user supplied key so that it (the S-box) satisfies one property: all four of the one-byte (8-bit) columns in the S-box must be permutations of one another. This is shown clearly in FIG. 3. As a given, the selection of a different S-box entry changes all four bytes generated by the S-box. As stated earlier, the rotation schedule insures that the S-box is accessed no more than once by any 8-bit byte in the original 64-bit clear text unit. Every 2 rounds of the process rotates each 32-bit word once. After 8 rounds both 32-bit words have returned to their original position. To prevent any repeated use of the same S-box entry after the 32-bit words return to their original position, a new S-box is used. Thus, every different input to an S-box must produce an output whose every byte differs from every byte in any other possible output. In other words, for any 2 32-bit entries in an S-box which are indexed by different indices, the entries differ in all 4 bytes.

The pre-computation of a pseudo-random S-box satisfying the desired properties can be divided into two stages. First, a stream of pseudo-random bytes is generated. Second, the stream of pseudo-random bytes is used to generate four pseudo-random permutations that map 8 bits to 8 bits. These four pseudo-random permutations are the generated S-box.

A stream of pseudo-random bytes could be generated by an encryption function. The obvious circularity problem caused thereby requires the use of a 'standard' S-box. This standard S-box is particularly useful in conjunction with the second method described herein (the second method, as it is only used to encrypt small amounts of data, cannot spend time pre-computing S-boxes). The creation of this standard S-box will be described subsequently.

Assuming the existence of an S-box, a 64-byte 'state' value for the pseudo-random byte-stream generator is adopted. A user-provided key is used to initialize a 64-byte block (thereby limiting the key size to 512 bits). This 64-byte block is then encrypted using the first method, using the standard S-box instead of an S-box generated from a key, in a cipher block chaining mode, known in the art. This generates 64 pseudo-random bytes. After these 64 bytes have been used, the 64-byte block is once again encrypted, providing an additional 64 pseudo-random bytes. This process may be repeated as often as necessary to provide additional pseudo random bytes.

Once the stream of pseudo-random bytes is available, they are converted into the needed permutations. A known algorithm is used for this purpose and it is found in Knuth, *Seminumerical Algorithms, Vol II,* Addison-Wesley Publishing Co., 1969, p. 125. The algorithm starts with a pre-existing, but not necessarily random, permutation. In this invention, the standard S-box is the starting point. Each element (byte) in the initial permutation is then interchanged with some other randomly chosen element, thereby providing a random permutation. The general concept for generating a random permutation from a pseudo-random or random sequence is shown in FIG. 4. The specific routine is given in the routine "SBoxFromRandomArray." The specific method used to generate pseudo-random numbers is not critical to this invention. Any one of several algorithms known in the art can be used.

A standard S-box is needed for two reasons. It is used with the first method to generate a pseudo-random stream of bytes. The second method relies on the standard S-box to reduce overall computation time. As a design objective, the generation of this S-box must be public, thereby avoiding a criticism of DES, where S-box generation is secret, fueling speculation that "trap doors" might allow decryption by the DES creators. It has been decided that the program which generates the standard S-box from a stream of random numbers will be made public and the stream of random numbers which is used as input to the program will be selected in such a manner as to eliminate the possibility of a "trap door" or other weakness having been inserted.

These criteria are met by publishing the algorithm used to generate the standard S-box and by using a set of random numbers published in 1955 by the RAND Corp ("A Million Random Digits with 100,000 Normal Deviates"). This standard algorithm is shown in FIG. 4. This algorithm is the same as the Knuth algorithm discussed previously.

The second method of data encryption is similar to the first method except that the S-box is not precomputed. Rather, this method uses the standard S-box, which allows the method to encrypt a single 64-bit block of data without lengthy pre-computation. However, this means that some new mechanism for mixing in key material must be adopted because the standard S-box cannot serve as the key. The mechanism of key-mixing is simple. Key material is XORed with the 64-bit data block before the first round of the algorithm and thereafter following every 9th round. A consequence of this method is that the key must be a multiple of 64 bits. For commercial applications 64-bit and 128-bit keys will be acceptable. Although larger keys can be used, this slows down the encryption.

The details of this second method are shown in the appended C code routine "Khafre." The flow chart of FIG. 1 illustrates "Khafre" except that in "Khafre" the S-box is fixed, publicly known and does not change, and 64-bits of key material are exclusive-ORed prior to the first round and thereafter following every 8 rounds. In contrast, the first method exclusive-ORs 64-bits of key material prior to the first round and 64-bits of key material following the last round only.

The somewhat complex termination criteria for the WHILE loops in routine "Khafre" means that all 64-bit blocks of key material are used the same number of times. Although this has only a small cryptographic value, it does simplify decryption. If all of the 64-bit key blocks are used exactly once, then decryption proceeds by using the last key block (Key [enoughKey-1] and working backwards. If this were not the case, decryption would have to begin at a key block computed as: enoughkey-enough/8 MOD enoughkey. Although not difficult to compute, the 'MOD' operation is often time consuming on microprocessors, which would unnecessarily slow down decryption. The MOD operation within the loop can be eliminated if the loop is unrolled 8 times—this will increase speed for other reasons. It is expected that most implementations will unroll the inner loop 8 times.

This second method will probably require more rounds than the first method to reach the same level of security due to the use of a fixed S-box. Additionally, each round of the second method is somewhat more complex than each round of the first method. Consequently, the second method takes longer than the first to encrypt each 64-bit block. On the other hand, the second method does not require pre-computation of the S-box and so will encrypt small amounts of data more quickly than the first.

In the foregoing specification, the invention has been described with reference to a specific exemplary embodiment thereof. It will, however, be evident that various modifications and changes may be made thereunto without departing from the broader spirit and scope of the invention as set forth in the appended claims. For example, the number of encryption rounds can be readily changed to increase the security level. Other methods to generate permutations for the S-boxes might be used. Many such changes or modifications are readily envisioned. The specification and drawings are, accordingly, to be regarded in an illustrative rather than in an restrictive manner.

APPENDIX A

/* This is a reference implementation of two of the Pharaonic Ciphers, Khufu
and Khafre. Snefru -- a one-way hash function, is available separately.

Khufu is a conventional encryption function. It has a block size of 64 bits.
The number of rounds is a user selectable parameter. The keysize is
limited to 64 bytes (512 bits). The S-boxes used in
Khufu are computed from the user-provided key (which takes additional
time) but it encrypts a 64-bit block faster than Khafre. Khufu appears to
provide good security when used with 16 rounds (statement made as of
February, 1989. See notice below, however).

Khafre is a conventional encryption function. It has a block size of 64
bits. The number of rounds is a user selectable parameter. The keysize
can be as large as the user desires (though larger key sizes result in
slower encryption). The S-boxes are fixed (they do not depend on the
user-provided key) so no pre-computations are required before encrypting a
64-bit block. However, it takes somewhat more time to encrypt each block
than Khufu. Khafre probably requires 24 or 32 rounds to provide good security
(statement made as of February, 1989. See notice below, however).

This is version 1.0, February 9, 1989.

This version has not been cleared for release outside Xerox. Therefore, it
is XEROX PROPRIETARY DATA.

Copyright (c) Xerox Corporation 1989
All rights reserved.

Xerox Corporation makes no representations concerning either the
merchantability of this software or the suitability of this software for any
particular purpose.

NOT TO BE EXPORTED IN ANY FORM FROM THE UNITED STATES
WITHOUT ADVANCE APPROVAL OF THE U.S. GOVERNMENT.

These notices must be retained in any copies of any part of this software.

EFFICIENCY WARNING: This program performs many self-tests. These substantially
slow it down. Fast implementations need to remove most or all of these self-tests.

VAX EFFICIENCY WARNING:

Encryption and decryption of data on a VAX will work correctly, however....

This program will work on both VAXes and SUNs. It should be portable
to any machine no matter WHAT permutation is used to convert four bytes
of 'char' data to 4 bytes of 'unsigned long' data. However, it uses the two
routines 'convertLongToChar' and 'convertCharToLong'. This implementation
is so designed that these routines are noops (i.e., the calls to these routines can be deleted) on the SUN. However, in order to delete these calls on a VAX
(or other machine with a non-SUN byte ordering) the encryption algorithm
must be re-written by permuting the order of the bytes in each S-box entry,
and by altering the order in which bytes are selected from each 'unsigned long int'
of input or output data. (This observation is courtesy of Dan Greene).

If the algorithm is not so re-written, then the performance on a VAX
(or other non-SUN machine) will suffer.

This program reads from the standard input until EOF is reached, or until no
more data is read (a 'read' returns 0 bytes of data). In encrypt mode,
the data on the standard input is encrypted in cipher-block-chaining mode
with Khufu or Khafre. The resulting ciphertext is then placed on the standard
output (in binary). In decrypt mode, the data on the standard input is
decrypted in cipher-block-chaining mode with Khufu or Khafre, and the
cleartext is placed on standard output.

The key for encryption or decryption is read from the command line, in hex.

The format of the command line is:

pharaoh [khufu | khafre] <hex key> [ [e | e0 | d] [ <number of rounds> ] ]

The third parameter is either 'e' (encryption), 'e0' (encryption and force the IV to be 0), or
'd' (decryption). Forcing the IV to be zero is useful for debugging -- it prevents a
random IV from being selected each time input is encrypted, thus making the algorithm
deterministic.

At the present time (February 1989) the author knows of no method for breaking
these encryption functions using a chosen plain-text attack, provided the
key is 64 bits or more and the number of rounds is sufficient. Further
study to provide recomendations on the least number of rounds which
provides effective security is in progress. The algorithms are currently
undergoing security review by others. If anyone using this program finds
a way to break either encryption function, please contact Ralph C. Merkle
via E-mail (merkle@xerox.com) or via normal mail at: Xerox PARC, 3333
Coyote Hill Road, Palo Alto, CA 94304. (415) 494-4000

See the paper 'A Software Encryption Function', by Ralph C. Merkle, for a
more detailed explanation. Warning: several of the arrays in the paper
start at 1, while all the arrays in this implementation are zero-based.
This will cause an 'off by 1' difference between the paper and this
implementation in many instances.

Note that 'unsigned long int' MUST be 32 bits
Implementors: Ralph C. Merkle and Luis Rodriguez

TEST INPUTS:

The following two lines can be entered from a terminal to test Khufu:
pharaoh khufu 345 e0 16 | od -x
Hello there, world!

The result on a VAX should be:
0000000 0000 0000 0000 0000 a1da 489c 0ec6 4729
0000020 7fc8 57d8 ebbe 711d 6cd7 1bc0 e61d be61
0000040

The result on a SUN should be:
0000000 0000 0000 0000 0000 daa1 9c48 c60e 2947
0000020 c87f d857 beeb 1d71 d76c c01b 1de6 61be
0000040

The following two lines can be entered from a terminal to test Khafre:
pharaoh khafre 345 e0 16 | od −x
Hello there, world!

The result on a SUN should be:
0000000 0000 0000 0000 0000 8662 f673 4e93 48d7
0000020 e300 c7ce d25c 8b85 379e ad82 e168 1d4c
0000040

The result on a VAX should be:
0000000 0000 0000 0000 0000 6286 73f6 934e d748
0000020 00e3 cec7 5cd2 858b 9e37 82ad 68e1 4c1d
0000040
*/

```
/* include the files required to define the 'time' function − − their only use
    is in the routine 'generateIV' which trys to (at least somewhat) randomize
    the Initial Vector
*/
#include <sys/types.h>
include <sys/timeb.h> define inputFile 0     /* normally standard in */
define outputFile 1    /* normally standard out */
define errorFile 2     /* normally standard error */ define bufferSize 1024
define bufferSizeInWords 256  /* MUST be bufferSize/4 */ define testBufferSize    1024
define testBufferSizeInWords 256 define testKhufuBufferSize 1024
define testKhufuBufferSizeInWords 256 define maxSBoxCount 8    /* number of S boxes in the set of standard S
           boxes */
#define preInitializedSBoxCount 8  /* number of S boxes that are
             pre−initialized */
#define initialSBoxCount 2 /* only need two sBoxes in the initialSBoxes
           array */
```

```c
#define maxKeySize   16   /* maximum key size in 32-bit words. 8
            implies 8*32 = 256 bits. WARNING - - - THIS
            PARAMETER MUST BE 16 or LARGER */ define encryptDirection 1
define decryptDirection 0
#define useKhufu     1
define useKhafre    0 define trailingOne  (-128)  /* really 1000 0000 in binary */ define TRUE  1
define FALSE 0

/* The following table is the first part of the random digits from the book:
   'A Million Random Digits with 100,000 Normal Deviates", by the RAND
   Corporation, published by the Free Press, 1955. The formatting is similar
   to the book to allow easy inspection and verification. The random digits
   are also available on magnetic tape or diskettes from the RAND
   corporation.

Send inquiries to: The RAND Corporation, Computer Information Systems, 1700
   Main St., Santa Monica California 90406; ATTN: Jackie McGee

*/

/* The following two global variables are used only by 'randomDigit' */
int   locationInRANDtable = 0;/* group location in the table of random
            digits */
int   locationIn5DigitGroup = 0;  /* location within a 5-digit group */ define sizeOfRANDtableIn5DigitGroups 606
char  RANDtable[sizeOfRANDtableIn5DigitGroups][5] = {

"10097", "32533", "76520", "13586", "34673", "54876", "80959", "09117", "39292",
"74945",
  "37542", "04805", "64894", "74296", "24805", "24037", "20636", "10402", "00822",
"91665",
  "08422", "68953", "19645", "09303", "23209", "02560", "15953", "34764", "35080",
"33606",
  "99019", "02529", "09376", "70715", "38311", "31165", "88676", "74397", "04436",
"27659",
  "12807", "99970", "80157", "36147", "64032", "36653", "98951", "16877", "12171",
"76833",

"66065", "74717", "34072", "76850", "36697", "36170", "65813", "39885", "11199",
"29170",
  "31060", "10805", "45571", "82406", "35303", "42614", "86799", "07439", "23403",
"09732",
  "85269", "77602", "02051", "65692", "68665", "74818", "73053", "85247", "18623",
"88579",
  "63573", "32135", "05325", "47048", "90553", "57548", "28468", "28709", "83491",
"25624",
  "73796", "45753", "03529", "64778", "35808", "34282", "60935", "20344", "35273",
"88435",
```

"98520", "17767", "14905", "68607", "22109", "40558", "60970", "93433", "50500", "73998",
"11805", "05431", "39808", "27732", "50725", "68248", "29405", "24201", "52775", "67851",
"83452", "99634", "06288", "98083", "13746", "70078", "18475", "40610", "68711", "77817",
"88685", "40200", "86507", "58401", "36766", "67951", "90364", "76493", "29609", "11062",
"99594", "67348", "87517", "64969", "91826", "08928", "93785", "61368", "23478", "34113",

"65481", "17674", "17468", "50950", "58047", "76974", "73039", "57186", "40218", "16544",
"80124", "35635", "17727", "08015", "45318", "22374", "21115", "78253", "14385", "53763",
"74350", "99817", "77402", "77214", "43236", "00210", "45521", "64237", "96286", "02655",
"69916", "26803", "66252", "29148", "36936", "87203", "76621", "13990", "94400", "56418",
"09893", "20505", "14225", "68514", "46427", "56788", "96297", "78822", "54382", "14598",

"91499", "14523", "68479", "27686", "46162", "83554", "94750", "89923", "37089", "20048",
"80336", "94598", "26940", "36858", "70297", "34135", "53140", "33340", "42050", "82341",
"44104", "81949", "85157", "47954", "32979", "26575", "57600", "40881", "22222", "06413",
"12550", "73742", "11100", "02040", "12860", "74697", "96644", "89439", "28707", "25815",
"63606", "49329", "16505", "34484", "40219", "52563", "43651", "77082", "07207", "31790",

"61196", "90446", "26457", "47774", "51924", "33729", "65394", "59593", "42582", "60527",
"15474", "45266", "95270", "79953", "59367", "83848", "82396", "10118", "33211", "59466",
"94557", "28573", "67897", "54387", "54622", "44431", "91190", "42592", "92927", "45973",
"42481", "16213", "97344", "08721", "16868", "48767", "03071", "12059", "25701", "46670",
"23523", "78317", "73208", "89837", "68935", "91416", "26252", "29663", "05522", "82562",

"04493", "52494", "75246", "33824", "45862", "51025", "61962", "79335", "65337", "12472",
"00549", "97654", "64051", "88159", "96119", "63896", "54692", "82391", "23287", "29529",
"35963", "15307", "26898", "09354", "33351", "35462", "77974", "50024", "90103", "39333",
"59808", "08391", "45427", "26842", "83609", "49700", "13021", "24892", "78565", "20106",
"46058", "85236", "01390", "92286", "77281", "44077", "93910", "83647", "70617", "42941",

"32179", "00597", "87379", "25241", "05567", "07007", "86743", "17157", "85394", "11838",
"69234", "61406", "20117", "45204", "15956", "60000", "18743", "92423", "97118", "96338",
"19565", "41430", "01758", "75379", "40419", "21585", "66674", "36806", "84962", "85207",
"45155", "14938", "19476", "07246", "43667", "94543", "59047", "90033", "20826", "69541",
"94864", "31994", "36168", "10851", "34888", "81553", "01540", "35456", "05014", "51176",

"98086", "24826", "45240", "28404", "44999", "08896", "39094", "73407", "35441", "31880",
"33185", "16232", "41941", "50949", "89435", "48581", "88695", "41994", "37548", "73043",
"80951", "00406", "96382", "70774", "20151", "23387", "25016", "25298", "94624", "61171",
"79752", "49140", "71961", "28296", "69861", "02591", "74852", "20539", "00387", "59579",
"18633", "32537", "98145", "06571", "31010", "24674", "05455", "61427", "77938", "91936",

"74029", "43902", "77557", "32270", "97790", "17119", "52527", "58021", "80814", "51748",
"54178", "45611", "80993", "37143", "05335", "12969", "56127", "19255", "36040", "90324",
"11664", "49883", "52079", "84827", "59381", "71539", "09973", "33440", "88461", "23356",
"48324", "77928", "31249", "64710", "02295", "36870", "32307", "57546", "15020", "09994",
"69074", "94138", "87637", "91976", "35584", "04401", "10518", "21615", "01848", "76938",

"09188", "20097", "32825", "39527", "04220", "86304", "83389", "87374", "64278", "58044",
"90045", "85497", "51981", "50654", "94938", "81997", "91870", "76150", "68476", "64659",
"73189", "50207", "47677", "26269", "62290", "64464", "27124", "67018", "41361", "82760",
"75768", "76490", "20971", "87749", "90429", "12272", "95375", "05871", "93823", "43178",
"54016", "44056", "66281", "31003", "00682", "27398", "20714", "53295", "07706", "17813",

"08358", "69910", "78542", "42785", "13661", "58873", "04618", "97553", "31223", "08420",
"28306", "03264", "81333", "10591", "40510", "07893", "32604", "60475", "94119", "01840",
"53840", "86233", "81594", "13628", "51215", "90290", "28466", "68795", "77762", "20791",
"91757", "53741", "61613", "62269", "50263", "90212", "55781", "76514", "83483", "47055",
"89415", "92694", "00397", "58391", "12607", "17646", "48949", "72306", "94541", "37408",

"77513", "03820", "86864", "29901", "68414", "82774"

};

```c
char  *khufuString = "khufu";
char  *khafreString = "khafre";

int  KhufuKhafreFlag;

int  numberOfRounds = 32;  /* initialize the default value for the
        security parameter */ int  shiftTable[8] = {16, 16, 8, 8, 16, 16, 24, 24};

typedef unsigned long int sBox[256];

/* The standard S boxes are defined in another file */
extern sBox standardSBoxes[maxSBoxCount];
sBox  keySBoxes[maxSBoxCount];/* the key S boxes generated by Khufu */
unsigned long int auxKeys[4]; /* auxilliary key material used by Khufu */

/* an array needed only for the fast version of Khafre. It's safe to ignore
   this array if you don't need to understand the speeded up version. Note
   that rotatedRightStandardSBoxes[i][j][k] is rotated right by i*8 bits */
sBox  rotatedRightStandardSBoxes[4][maxSBoxCount];

/* The following routine is a simple error exit routine -- it prints a
   message and aborts */
void  errAbort (s)
   char  *s;
{
   int  length;

for (length = 0; s[length] != 0; length++);
   if (write (errorFile, s, length) != length) exit(2);
   if (write (errorFile, "\n", 1) != 1) exit(2);
   exit (1);
};

/* The following routine converts a byte array to an array of unsigned long
   int. It is primarily intended to eliminate the byte-ordering problem.
   VAXes order the bytes in a character array differently than SUN's do. Note
   that this routine will SLOW DOWN THE HASH FUNCTION.
   Thanks to an observation by Dan Greene, it should be possible to permute the
   bytes in the S-boxes and permute the order in which bytes are used in encryption
   to effectively eliminate the need for this conversion on VAXes as well
   as on SUNs */
/* This Routine Is Not Needed On SUNs, and should be deleted! */ void  convertCharToLong (charBuffer, wordBuffer, length)
   char  charBuffer[/* length */];
unsigned long int wordBuffer[/* length/4 */];
```

```
{
  int   i;
  unsigned long int t0, t1, t2, t3;

/* charBuffer - -     an input buffer of characters wordBuffer - -  an output buffer of unsigned long int's

*/ for (i = 0; i < (length/4); i++){ t0 = charBuffer[4 * i];
    t1 = charBuffer[4 * i + 1];
    t2 = charBuffer[4 * i + 2];
    t3 = charBuffer[4 * i + 3];
    t0 &= 0xff;
    t1 &= 0xff;
    t2 &= 0xff;
    t3 &= 0xff;
    wordBuffer[i] = (t0 << 24) | (t1 << 16) | (t2 << 8) | t3;

};

};

/* The following routine converts an array of unsigned long int to a byte array.
   It is primarily intended to eliminate the byte-ordering problem.
   VAXes order the bytes in a character array differently than SUN's do. Note
   that this routine will SLOW DOWN THE HASH FUNCTION.
   Thanks to an observation by Dan Greene, it should be possible to permute
   the bytes in the S-boxes and permute the order in which bytes are used
   in encryption to effectively eliminate the need for this conversion on
   VAXes as well as on SUNs */
/* This Routine Is Not Needed On SUNs! */ void   convertLongToChar (wordBuffer, charBuffer, length)
  char   charBuffer[/* length */];
unsigned long int wordBuffer[/* length/4 */];

{
  int   i;
  unsigned long int temp;

/* wordBuffer - -     an input buffer of words (unsigned long int)

charBuffer - -  an output buffer of bytes (char)

*/ for (i = 0; i < (length/4); i++){ temp = wordBuffer[i];
      charBuffer[4 * i]     = (temp >> 24) & 0xff;
    charBuffer[4 * i + 1] = (temp >> 16) & 0xff;
    charBuffer[4 * i + 2] = (temp >>  8) & 0xff;
    charBuffer[4 * i + 3] = (temp >>  0) & 0xff;
```

};

};

```
unsigned long int rotateRight (word, rotateAmount)
/* rotate the 32-bit 'word' argument right by 'rotateMount' bits. Values of
   'rotateAmount' less than 0 or greater than 32 are errors and will not work
   correctly. */ unsigned long int word;
   int   rotateAmount;
{
   return ((word >> rotateAmount) | (word << (32 - rotateAmount)));
};

int  hexValueOf(c)
/* convert character 'c' into a hex value in the obvious way */
   char  c;
{
   if ((c >= '0') && (c <= '9'))
      return (c - '0');
   if ((c >= 'a') && (c <= 'f'))
      return (c - 'a' + 10);
   if ((c >= 'A') && (c <= 'F'))
      return (c - 'A' + 10);
   errAbort ("non-hex character encountered in hex string");
   return(-1);
};

void  fastKhafre (input, output, byteCount, direction, IV, key, keySize, localRounds)
/* A more efficient implementation of Khafre. The inner loop is unrolled
   eight times, and the then-obvious optimizations are made. This is not the
   most efficient implementation, but should illustrate most of the main
   points 'input' and 'output' are arrays of whatever length the user wants. They
      should not overlap, or weird things can happen. In-place encryption,
      i.e., input=output, should work correctly.

'byteCount' is the number of bytes of data in the input, and the number of
      bytes that will be overwritten in the output. Note that the size of the
      output array should be rounded up to the next multiple of 8 bytes. That
      is, if you encrypt 12 bytes, 16 bytes of output will be generated and the
      output array should be big enough to hold all 16 bytes.

'direction' is either 'encryptDirection' or 'decryptDirection', defined at
      the start of this file.

'IV' is a 64-bit array consisting of two 32-bit elements. The 64-bit value
      is the 'Initialization Vector' used in cipher-feedback encryption and
      decryption. Basically, in cipher feedback each 64-bit block of plaintext
``` is XOR—ed with the preceding 64—bits of ciphertext. The first 64—bit block of plaintext is XOR—ed with the IV — — which starts things off (hence the name INITIALIZATION Vector).

'key' is an array of 32—bit elements which defines the key. The key can be of any length, though the key size and number of rounds have to 'correspond'. That is, some pairs of values for the key size and the number of rounds are forbidden.

'keySize' is the size, in 32—bit words, of the key. Because the key must be a multiple of 64 bits in length, the keySize must be a multiple of 2.

'localRounds' is the security parameter that specifies the number of 'rounds', or repetitions of the basic encryption loop (see the simple implementation of Khafre) will be done. Typical values will be in the range from 16 to 64. Recomendations for the value for this parameter are not yet available.

```
*/ unsigned long int input[];
unsigned long int output[];
int   byteCount;   /* the number of bytes to be
         encrypted/decrypted */
int   direction;
unsigned long int IV[];
unsigned long int key[];
int   keySize;   /* number of 32—bit blocks in the key */
int   localRounds;

{ unsigned long int IV0;
   unsigned long int IV1;
   unsigned long int left;
   unsigned long int right;
   unsigned long int keyLo;
   unsigned long int keyHi;
   unsigned long int *sBoxPtr;  /* pointer to the current s box */
   int   currentWord;
   int   keyIndex;
   int   octets;
   int   octetsCount;  /* counts from 0 up to octets during
         encryption */ if (keySize % 2 != 0)
   errAbort ("key size must be even number of 32—bit words");

octets = localRounds / 8;
if (localRounds % 8 != 0)
   errAbort ("Number of rounds must be a multiple of 8");

/* keySize/2 must evenly divide (octets+1). */
if ((octets, + 1) % (keySize / 2) != 0)
   errAbort ("key size incompatible with number of rounds");

IV0 = IV[0];
IV1 = IV[1];
```

```
for (currentWord = 0; currentWord < (byteCount / 4); currentWord += 2) {
  left = input[currentWord];
  right = input[currentWord + 1];
  if (direction == encryptDirection) {
    keyIndex = 0;
    octetsCount = 0;
    left ^= IV0;
    right ^= IV1;
    while (TRUE) {
      keyLo = key[keyIndex];
      keyHi = key[keyIndex + 1];

keyLo = (keyLo >> octetsCount) | (keyLo << (32 - octetsCount));
      keyHi = (keyHi >> octetsCount) | (keyHi << (32 - octetsCount));

left ^= keyLo;
      right ^= keyHi;

/* Force the number of rounds to be an
         integral multiple of keySize*4 */
      keyIndex += 2;
      if (keyIndex == keySize)
        if (octetsCount >= octets) {
          if (octetsCount > octets)
            errAbort("key size incompatible with number of rounds");
          IV0 = left;
          IV1 = right;
          goto exitFromLoop;
        } else
          keyIndex = 0;

sBoxPtr = rotatedRightStandardSBoxes[0][octetsCount];
      /* the following 8 lines are 8 rounds,
         unrolled */
      /* note that sBoxPtr[ something +
         n*256*maxSBoxCount ] is equivalent to
         rotateRight(sBoxPtr[ something ], n*8) */
      right ^= sBoxPtr[left & 0xff];
      left  ^= sBoxPtr[(right & 0xff) + 2 * 256 * maxSBoxCount];
      right ^= sBoxPtr[((left >> 16) & 0xff) + 2 * 256 * maxSBoxCount];
      left  ^= sBoxPtr[((right >> 16) & 0xff) + 256 * maxSBoxCount];
      right ^= sBoxPtr[(left >> 24) + 256 * maxSBoxCount];
      left  ^= sBoxPtr[(right >> 24) + 3 * 256 * maxSBoxCount];
      right ^= sBoxPtr[((left >> 8) & 0xff) + 3 * 256 * maxSBoxCount];
      left  ^= sBoxPtr[(right >> 8) & 0xff];

octetsCount++;
    };

} else {
    keyIndex = keySize - 2;
    octetsCount = octets;
    while (TRUE) {
      keyLo = key[keyIndex];
      keyHi = key[keyIndex + 1];
```

```
    keyLo = (keyLo >> octetsCount) | (keyLo << (32 - octetsCount));
    keyHi = (keyHi >> octetsCount) | (keyHi << (32 - octetsCount));

left ^= keyLo;
        right ^= keyHi;

/* Force the number of rounds to be an
           integral multiple of (keySize*4)-1 */
        if (keyIndex == 0)
          if (octetsCount <= 0) {
            if (octetsCount < 0)
              errAbort("key size incompatible with number of rounds");
            left ^= IV0;
            right ^= IV1;
            IV0 = input[currentWord];
            IV1 = input[currentWord + 1];
            goto exitFromLoop;
          } else
            keyIndex = keySize;
        keyIndex -= 2;
        octetsCount--;

sBoxPtr = rotatedRightStandardSBoxes[0][octetsCount];
        /* the following 8 lines are 8 rounds,
           unrolled */
        left  ^= sBoxPtr[(right >> 8) & 0xff];
        right ^= sBoxPtr[((left >> 8) & 0xff) + 3 * 256 * maxSBoxCount];
        left  ^= sBoxPtr[(right >> 24) + 3 * 256 * maxSBoxCount];
        right ^= sBoxPtr[(left >> 24) + 256 * maxSBoxCount];
        left  ^= sBoxPtr[((right >> 16) & 0xff) + 256 * maxSBoxCount];
        right ^= sBoxPtr[((left >> 16) & 0xff) + 2 * 256 * maxSBoxCount];
        left  ^= sBoxPtr[((right >> 0) & 0xff) + 2 * 256 * maxSBoxCount];
        right ^= sBoxPtr[(left >> 0) & 0xff];

};

};

exitFromLoop:
    output[currentWord] = left;
    output[currentWord + 1] = right;
  };    /* end of for(currentWord...) */
};

void  Khafre (input, output, byteCount, direction, IV, key, keySize, localRounds)
/* This is a reference implementation of Khafre. It is very slow, and in
   general should not be used for production encryption. It is intended to
   serve as a definition of Khafre, and to illustrate the algorithm as
   clearly as possible.

'input' and 'output' are arrays of whatever length the user wants. They
   should not overlap, or weird things can happen. In-place encryption,
   i.e., input=output, should work correctly.
```

'byteCount' is the number of bytes of data in the input, and the number of
bytes that will be overwritten in the output. Note that the size of the
output array should be rounded up to the next multiple of 8 bytes. That
is, if you encrypt 12 bytes, 16 bytes of output will be generated and the
output array should be big enough to hold all 16 bytes.

'direction' is either 'encryptDirection' or 'decryptDirection', defined at
the start of this file.

'IV' is a 64-bit array consisting of two 32-bit elements. The 64-bit value
is the 'Initialization Vector' used in cipher-feedback encryption and
decryption. Basically, in cipher feedback each 64-bit block of plaintext
is XOR-ed with the preceding 64-bits of ciphertext. The first 64-bit
block of plaintext is XOR-ed with the IV -- which starts things off (hence
the name INITIALIZATION Vector).

'key' is an array of 32-bit elements which defines the key. The key can be
of any length, though the key size and number of rounds have to
'correspond'. That is, some pairs of values for the key size and the
number of rounds are forbidden. A 64-bit key size can be used with 8, 16,
24, 32, ... rounds. A 128-bit key size can only be used with 8, 24, 40,
56, ... rounds 'keySize' is the size, in 32-bit words, of the key. Because the key must be
a multiple of 64 bits in length, the keySize must be a multiple of 2.

'localRounds' is the security parameter that specifies the number of
'rounds', or repetitions of the basic encryption loop (see the simple
implementation of Khafre) will be done. Typical values will be in the
range from 16 to 64. Recomendations for the value for this parameter are
not yet available.

*/

```
   unsigned long int input[];
unsigned long int output[];
int    byteCount;    /* the number of bytes to be
         encrypted/decrypted */
int    direction;
unsigned long int IV[];
unsigned long int key[];
int    keySize;    /* number of 32-bit blocks in the key */
int    localRounds;

{ unsigned long int left;
   unsigned long int right;
   unsigned long int temp;
   unsigned long int keyLo;
   unsigned long int keyHi;
   unsigned long int IV0;
   unsigned long int IV1;
   int    currentWord;
   int    currentRound;
```

```
int    keyIndex;
int    octets;
int    octetsCount;  /* counts from 0 up to octets during
          encryption. 'octets' is the number of
          rounds divided by 8 */ if (keySize % 2 != 0)
   errAbort ("key must be a multiple of 64-bits in length");

if (localRounds % 8 != 0)
   errAbort ("Number of rounds must be a multiple of 8");

octets = localRounds / 8;

/* keySize/2 must evenly divide (octets+1). */
if ((octets + 1) % (keySize / 2) != 0)
   errAbort ("key size incompatible with number of rounds");

IV0 = IV[0];
IV1 = IV[1];

/* the following loop is repeated for every 64-bit block in the input
   array. currentWord is the index into a 32-bit array, so it
   increases by 2 for each iteration of the loop. */
for (currentWord = 0; currentWord < (byteCount / 4); currentWord += 2) {
   left = input[currentWord];
   right = input[currentWord + 1];
   if (direction == encryptDirection) {
      /* encrypt the 64-bit block held as two 32-bit pieces
         in 'left' and 'right' */
      keyIndex = 0;
      octetsCount = 0;
      left ^= IV0;
      right ^= IV1;
      while (TRUE) {
         /* The number of iterations of this loop is
            controlled by 'octets' */
         keyLo = key[keyIndex];
         keyHi = key[keyIndex + 1];

keyLo = rotateRight (keyLo, octetsCount);
         keyHi = rotateRight (keyHi, octetsCount);

left ^= keyLo;
         right ^= keyHi;

/* Force the number of rounds to be an
            integral multiple of keySize*4 */
         keyIndex += 2;
         if (keyIndex == keySize)
            keyIndex = 0;  /* keyIndex mod keySize */ if (octetsCount >= octets) {
```

```
            /* If the test for a valid
               relationship between 'keySize' and
               'octets' earlier has been passed,
               the following condition should
               never be true. */
            if (keyIndex != 0)
                errAbort ("Invalid value for keySize parameter");

IV0 = left;
            IV1 = right;
            goto exitFromLoop;
        };

/* encrypt for 8 rounds */
        for (currentRound = 0; currentRound < 8; currentRound + +) {
            right ^= standardSBoxes[octetsCount][left & 0xff];
            left = rotateRight (left, shiftTable[currentRound]);
            temp = left;
            left = right;
            right = temp;
        };

octetsCount++;
    };

} else {
    /* The following simple assigment statement is why we
       ban certain pairs of values for keySize and
       octets. Decryption always begins with the last
       64-bits in the key array -- but this might be the
       WRONG place to start if arbitrary key sizes and
       arbitrary number of rounds were allowed. Computing
       the correct place to start would require a 'mod'
       operation, which would slow down decryption. */
    keyIndex = keySize - 2;
    octetsCount = octets;
    while (TRUE) {
        keyLo = key[keyIndex];
        keyHi = key[keyIndex + 1];

keyLo = rotateRight (keyLo, octetsCount);
        keyHi = rotateRight (keyHi, octetsCount);

left ^= keyLo;
        right ^= keyHi;

if (octetsCount == 0) {

/* The test involving 'octets' and
               'keySize' has already been passed
               earlier in the program --
               logically, the following condition
               could never be true. */
            if (keyIndex != 0)
                errAbort ("key size incompatible with number of rounds");
```

```
            left ^= IV0;
            right ^= IV1;
            IV0 = input[currentWord];
            IV1 = input[currentWord + 1];
            goto exitFromLoop;
          };
          if (keyIndex == 0)
            keyIndex = keySize; /* keyIndex mod keySize */ keyIndex -= 2;
          octetsCount--;

/* decrypt for 8 rounds */
          for (currentRound = 7; currentRound >= 0; currentRound--) {
            temp = left;
            left = right;
            right = temp;
            left = rotateRight (left, 32 - shiftTable[currentRound]);
            right ^= standardSBoxes[octetsCount][left & 0xff];
          };

};

};
exitFromLoop:
      output[currentWord] = left;
      output[currentWord + 1] = right;
    };        /* end of for(currentWord...) */
};

void  KhafreTwice (input, output, byteCount, direction, IV, key, keySize, localRounds)
    /* This dummy routine takes exactly the same arguments that Khafre and
       fastKhafre take. It then calls both Khafre and fastKhafre, and then
       compares their outputs. The outputs had better be the same, or something
       is wrong. This routine should NOT be used during production use -- it is
       part of the reference implementation and provides an easy way of verifying
       that Khafre and fastKhafre are producing identical results. */ unsigned long int input[];
    unsigned long int output[];
    int   byteCount;
    int   direction;
    unsigned long int IV[];
    unsigned long int key[];
    int   keySize;
    int   localRounds;

{
      unsigned long int out1[testBufferSizeInWords];
      unsigned long int out2[testBufferSizeInWords];
      int   i;

if (testBufferSize < byteCount)
        errAbort("Increase testBufferSizeInWords and recompile");
      Khafre ((unsigned long int *) input, (unsigned long int *) out1, byteCount, direction, IV,
```

```
                    key, keySize, localRounds);
  fastKhafre (input, out2,.byteCount, direction, IV, key, keySize, localRounds);
  for (i = 0; i < testBufferSizeInWords; i++)
    if(out1[i] != out2[i])
       errAbort(" Khafre and fastKhafre differ");
  for (i = 0; i < testBufferSizeInWords; i++)
    output[i] = out1[i];
};
```

```
void   Khufu (input, output, byteCount, direction, IV, localAuxKey, localSBoxes,
localRounds)
/* This is a reference implementation of Khufu. It is slow and should not be
   used in production. Unrolling the inner loop 16 times will result in a
   very fast implementation of a 16-round Khufu, which should provide
   adequate security for most commercial applications. The arguments are as
   follows:

input: the input array of data to be encrypted or decrypted using
   cipher-block chaining.

output: the output array of data produced by either encrypting or decrypting
   the input array.

byteCount: the number of bytes of input data to be encrypted/decrypted.
   'byteCount' must be a multiple of 8.

direction: an integer variable that is either 'encryptDirection' or
   'decryptDirection'.

IV:  The 64-bit initialization vector. IV is an array with 2 32-bit
   elements. It is not modified by this routine localAuxKey: a local copy of the auxilliary key -- this is a 128 bits of
   data logically divided into two 64-bit pieces. The first 64 bits are
   XORed with the plaintext data before encryption, while the last 64 bits
   are XORed with the ciphertext following encryption. It is implemented as
   a 4-element array, in which each element is 32-bits.

localSBoxes: this is the major portion of the keying material. This set of
   S-boxes is computed from the user-provided key by another routine. These
   S-boxes are used during the encryption/decryption process.

localRounds: the number of rounds to be used during the
   encryption/decryption process. Note that the number of rounds divided by 8
   is the number of 'octets', and that one S-box (an S-box is an array of 256
   elements, each element being 32 bits) must be provided for each octet.
   This is, to encrypt for 16 rounds requires two octets, and each octet
   requires its own S-box. Therefore, the localSBoxes array must be an array
   defined as: sBox localSBoxes[2]. This can also be viewed as: unsigned
   long int localSBoxes[2][256]. */ unsigned long int input[];
  unsigned long int output[];
```

```
int   byteCount;   /* the number of bytes to be
         encrypted/decrypted */
int   direction;
unsigned long int IV[];
unsigned long int localAuxKey[4];
sBox   localSBoxes[maxSBoxCount];
int   localRounds;

{ unsigned long int left;
  unsigned long int right;
  unsigned long int temp;
  unsigned long int IV0;
  unsigned long int IV1;
  int   currentWord;
  int   currentRound;
  int   octets;
  int   octetsCount;   /* counts from 0 up to octets during
         encryption */ octets = localRounds / 8;
  if (localRounds % 8 != 0)
    errAbort ("Number of rounds must be a multiple of 8");

IV0 = IV[0];
  IV1 = IV[1];

for (currentWord = 0; currentWord < (byteCount / 4); currentWord += 2) {
    left = input[currentWord];
    right = input[currentWord + 1];
    if (direction == encryptDirection) {
      left ^= IV0;
      right ^= IV1;
      left ^= localAuxKey[0];
      right ^= localAuxKey[1];

for (octetsCount = 0; octetsCount < octets; octetsCount++)
        for (currentRound = 0; currentRound < 8; currentRound++) {
          right ^= localSBoxes[octetsCount][left & 0xff];
          left = rotateRight (left, shiftTable[currentRound]);
          temp = left;
          left = right;
          right = temp;
        };

left ^= localAuxKey[2];
      right ^= localAuxKey[3];
      IV0 = left;
      IV1 = right;

} else {
      left ^= localAuxKey[2];
      right ^= localAuxKey[3];
```

```
    for (octetsCount = octets - 1; octetsCount >= 0; octetsCount--)
      for (currentRound = 7; currentRound >= 0; currentRound--) {
        temp = left;
        left = right;
        right = temp;
        left = rotateRight (left, 32 - shiftTable[currentRound]);
        right ^= localSBoxes[octetsCount][left & 0xff];
      };

left ^= IV0;
    right ^= IV1;
    left ^= localAuxKey[0];
    right ^= localAuxKey[1];
    IV0 = input[currentWord];
    IV1 = input[currentWord + 1];

};
    output[currentWord] = left;
    output[currentWord + 1] = right;
  };    /* end of for(currentWord...) */
};

void  swapBytesInSBox (anSBox, row1, row2, column)
  sBox  anSBox;
  unsigned int row1, row2, column;

/* Exchanges two bytes in a column in 'anSBox'. row1 and row2 are integers
   between 0 and 255 inclusive. 'column' is either 0, 1, 2 or 3 and refers
   to the byte position in a 32-bit word. 0 is the left-most byte. */
{
  /* mask designates the bytes to be exchanged */
  unsigned long int mask;
  unsigned long int temp;

mask = 0xFF000000;

/* 'column' must be between 0 and 3 */
  if (column > 3)
    errAbort ("bad column passed to swapBytesInSBox");

/* position the mask in the appropriate column */
  mask >>= (column * 8);

/* Swap the bytes indicated by 'mask' */
  temp = anSBox[row1];
  anSBox[row1] = (anSBox[row1] & (~mask)) | (anSBox[row2] & mask);
  anSBox[row2] = (anSBox[row2] & (~mask)) | (temp & mask);
} void  sBoxesFromRandomArray (randomBytes, localKeySBoxes, localAuxKeys)
/* This routine takes 16 words (64 bytes or 512 bits) as input in
   'randomBytes', and produces as output a pseudo-random set of S boxes
   (localKeySBoxes) and two 64-bit pseudo-random values to be XOR-ed before
   and after encryption of each 64-bit block (localAuxKeys). In short, this
   routine takes a 64-byte 'user key' and expands it into an 'internal key'
   suitable for direct use by the Khufu encryption function. */
```

```
/*
randomBytes: a 16 word (64 byte) array which holds the user-provided key on
    input, is used internally to hold the scrambled pseudo-random user key,
    and on output contains an undefined (scrambled) version of the input
    value.

localKeySBoxes: This array is undefined on input, and on output holds the S
    boxes used by Khufu to encrypt data. The S boxes are generated from
    'randomBytes' in a pseudo-random way.

localAuxKeys: This array is undefined on input, and on output holds 4 32-bit
    pseudo random numbers. */ unsigned long int randomBytes[16];
    sBox   localKeySBoxes[maxSBoxCount];
    unsigned long int localAuxKeys[4];

{
        sBox   initialSBoxes[initialSBoxCount];
        unsigned int randomRow;  /* the random row to be excahnged in
                localKeySBoxes */
        unsigned int row, column;  /* index variables */
        unsigned long int mask, smallerMask; /* used to keep random bytes
                in range */
        unsigned int count;   /* loop variable */
        unsigned long int *IVptr;  /* pointer to Initialization Vector */
        unsigned long int zeroAuxKey[4];
        int    i;
        int    sBoxNumber;

IVptr = &randomBytes[14]; /* set up pointer to IV */ for (i = 0; i < 4; i++)
        zeroAuxKey[i] = 0;   /* zero out zeroAuxKey */

/* set up the initialSBoxes. Note that initialSBoxes is just the
       zeroth entry in the standardSBoxes array repeated a few times.
       This zeroth sBox was in fact computed directly from a table of
       random numbers, while standardSBoxes[1....infinity] are computed
       from standardSBoxes[0]. */
    for (i = 0; i < initialSBoxCount; i++)
        for (row = 0; row < 256; row++)
            initialSBoxes[i][row] = standardSBoxes[0][row];

/* encrypt randomBytes array 3 times so it's REALLY random */
    for (count = 0; count < 3; count++)
        Khufu (randomBytes, randomBytes, 64, encryptDirection,
            IVptr, zeroAuxKey, initialSBoxes, 16);

/* copy initialSBoxes to localKeySBoxes */
    for (i = 0; i < maxSBoxCount; i++)
        for (row = 0; row < 256; row++)
            localKeySBoxes[i][row] = initialSBoxes[0][row];

localAuxKeys[0] = randomBytes[0];
```

```
localAuxKeys[1] = randomBytes[1];
localAuxKeys[2] = randomBytes[2];
localAuxKeys[3] = randomBytes[3];

/* 'count' tracks the relative byte in randomBytes currently being
   used */
count = 16;
/* iterate over the S boxes we need to generate */
for (sBoxNumber = 0; sBoxNumber < maxSBoxCount; sBoxNumber++) {
  /* iterate throught columns from left to right */
  for (column = 0; column < 4; column++) {
    /* set up to (initially) allow everything through (a
       bitwise AND mask) */
    mask = 0xff;
    /* smallerMask will be used when smaller numbers need
       to go through */
    smallerMask = (mask >> 1);
    /* iterate through rows from top to bottom */
    for (row = 0; row < 255; row++) {
      /* loop until a random number between row and
         255, inclusive, */
      /* has been chosen. */
      do {
        /* since each entry in randomRow
           represents 4 bytes, and we */
        /* are only interested in one, we
           need to access and mask it */
        /* the proper array entry (count >>
           2), since there are 4 */
        /* bytes per entry. */
        /* (3-(count & 3)) is the relative
           position of the byte we are */
        /* interested in within the array
           entry, so if we multiply it */
        /* by 8, we get the amount of bits we
           need to shift to */
        /* position the mask over the array
           entry. These two are */
        /* bitwise ANDed, and the result is
           shifted back so that */
        /* it resides in the least
           significant 8 bits (i.e. is */
        /* between 0 and 255, inclusive).
           This is really */
        /* hairy, but the 4 byte/entry
           structure of the array */
        /* makes encrypting easy and more
           efficient. */
        randomRow = row + (((mask << ((3 - (count & 3)) * 8))
              & randomBytes[count >> 2]) >> ((3 - (count & 3)) * 8));
        /* bump count to track the relative
           byte in randomBytes */
        count++;
        /* If we are out of random bytes, get
           some more */
        if (count > 63) {
          /* reset count to beginning
             of randomBytes */
```

```
      count = 0;
      /* encrypt randomBytes using
        cipher block chaining */
      Khufu (randomBytes, randomBytes, 64, encryptDirection,
          IVptr, zeroAuxKey, initialSBoxes, 16);
      /* adjust mask so that random
        numbers will more */
      /* probably be in range (not
        a joke) */
      while ((smallerMask | (255 - row)) = = smallerMask) {
        mask = smallerMask;
        smallerMask = (mask >> 1);
      }
    }
  }
  /* exit loop when a random number is in
    range. Remember: */
  /* the quantity row is being added to
      randomRow so */
    /* randomRow is guaranteed to be within
      row-255, inclusive */
    while (randomRow > 255);
    /* make the proper exchange in
      localKeySBoxes[sBoxNumber] */
    swapBytesInSBox (localKeySBoxes[sBoxNumber], row, randomRow, column);
  }
 }   /* end of for(column = ... */
 };  /* end of for(sBoxNumber = ... */
};

unsigned int randomDigit ()
/* generate a random digit in the range from 0 to 9, inclusive. Generate the
  digit simply by getting the next random digit from the RAND table of
  random digits */
{
  if (locationIn5DigitGroup = = 5) {
    locationIn5DigitGroup = 0;
    locationInRANDtable+ +;
  };
  if (locationInRANDtable > = sizeOfRANDtableIn5DigitGroups)
    errAbort ("Error in randomDigit -- attempt to ask for too many random digits");
  return (RANDtable[locationInRANDtable][locationIn5DigitGroup+ +] - '0');
};

unsigned int randomInRange (low, high)
  unsigned int low, high;

/* Returns a random integer in the range from low to high, inclusive */
/* gets random digits from RANDtable */
{
  unsigned int range;  /* contains the actual range needed */

/* the max possible random numbers given a certain number of digits */
  unsigned int maximum;
  unsigned int random;  /* the random number composed by appending
      digits */
```

```c
  range = (high - low) + 1;
  do {
    random = 0;  /* initialize */
    maximum = 1;  /* initialize */
    /* loop until random has as many digits as range */
    while (maximum < range) {
      maximum *= 10;  /* 0-n = n+1 possible random numbers */
      /* add another digit to the low end */
      random = (random * 10) + randomDigit ();
    }
  }

/* if random is not evenly mappable to range, try again */
  /* the operation (maximum/range) TRUNCATES the result to an unsigned
     int */
  while (random >= ((unsigned int) (maximum / range)) * range);
  /* map random to the range and add low to stay within (low,high) */
  return (low + (random % range));
} void   checkInitialSBox ()
/* computes initialSBox from the RAND table of random digits, then compares
   it with initialSBoxes[0] - - they should be equal. Uses RANDtable as the
   source for the random digits. */
{
  sBox   initialSBox;

/* column is from the set {0, 1, 2, 3}. 0 is the leftmost byte */
  unsigned int column, row;
  unsigned long int longRow;

/* Fill initial S box with a trivial permutation (0 - 255) */
  for (longRow = 0; longRow < 256; longRow++)
    initialSBox[longRow] = longRow | (longRow << 8) | (longRow << 16) | (longRow << 24);

for (column = 0; column < 4; column++) {
    for (row = 0; row < 255 /* 255 is correct */; row++)
      /* exchange random rows in the column. This ensures
         the */
      /* column remains a permutation of (0 - 255) */
      swapBytesInSBox (initialSBox, row, randomInRange (row, 255), column);
  }
  for (row = 0; row < 256; row++)
    if (initialSBox[row] != standardSBoxes[0][row])
      errAbort ("Error - - can't verify initial S box");
};

void   generateIV (IV, key, keySize, auxKeys, keySBoxes, rounds)

unsigned long int IV[];
unsigned long int key[];
int    keySize;
unsigned long int auxKeys[4];
sBox keySBoxes[maxSBoxCount];

/* generate 64 - bits of reasonably random stuff by encrypting the current time
   with the user - provided encryption key. */
```

```
{
  unsigned long int fakeIV[2];
  time_t time();

fakeIV[0] = 0;
  fakeIV[1] = 0;
  IV[0] = 0;
  IV[1] = 0;

/* Get the current time, and encrypt it for use as the Initialization
     Vector */
  IV[0] = (unsigned long int) time( (time_t *) 0);
  if(KhufuKhafreFlag == useKhafre)
    Khafre (IV, IV, 8,
       encryptDirection, fakeIV, key, keySize, rounds);
    else
      Khufu(IV, IV, 8, encryptDirection, fakeIV, auxKeys, keySBoxes, rounds);
};

void  main (argc, argv)
  int    argc;
  char  *argv[];

{ int   i;
  unsigned long int plainWordBuffer[bufferSizeInWords];
  char   *plainCharBuffer = (char *) plainWordBuffer; /* Equivalence the storage */ unsigned long int cipherWordBuffer[bufferSizeInWords];
  char   *cipherCharBuffer = (char*) cipherWordBuffer; /* Equivalence the storage */
  int    byteCount;  /* the count of the number of bytes we have
          in the buffer */
  int    bytesToWrite;  /* used only during decryption */
  unsigned long int key[maxKeySize];
  int    keySize = 0;
  unsigned long int IV[2];
  char charIV[8];
  int    encryptionFlag = 1;
  int    forceIVtoZero = FALSE; /* Debugging. When TRUE, Force the
          IV to be 0, rather than
          trying to generate a reasonably random value */

/* self-test, to make sure everything is okay. */
  /* First, test the standard S boxes to make sure they haven't been
     damaged. */
  /* Test to make sure each column is a permutation. */
  for (i = 0; i < preInitializedSBoxCount; i++) {
    char   testArray[256];
    int    testShift = 0;
    int  j;

for (testShift = 0; testShift < 32; testShift += 8) {
      for (j = 0; j < 256; j++)
        testArray[j] = 0;
```

```c
      for (j = 0; j < 256; j++)
        testArray[(standardSBoxes[i][j] >> testShift) & 0xff]++;
      for (j = 0; j < 256; j++)
        if (testArray[j] != 1)
          errAbort("Table error -- the standard S box is corrupted");
    };
};
/* Okay, the standard S-box hasn't been damaged */

/* Set up the rotated array for the fast encryption routine */
{
  int  index;   /* ranges over the S box indices */
  int  rotation;  /* ranges over the four possible
         byte-rotations */
  int  i;  /* ranges over the 256 possible S-box entries */ for (index = 0; index < preInitializedSBoxCount; index++)
    for (rotation = 0; rotation < 4; rotation++)
      for (i = 0; i < 256; i++)
        rotatedRightStandardSBoxes[rotation][index][i] =
          (standardSBoxes[index][i] >> (rotation * 8)) |
          (standardSBoxes[index][i] << (32 - rotation * 8));

};

/* Now try encrypting something. Note that we're testing both Khafre
   and fastKhafre here */
{
  unsigned long int testInput[testBufferSizeInWords];
  unsigned long int testOutput[testBufferSizeInWords];
  unsigned long int key[maxKeySize];
  int  j;

if (maxKeySize < 2)
    errAbort("maxKeySize too small");
  if (preInitializedSBoxCount != 8)
    errAbort("Wrong number of S boxes, update the self-test");
  if (preInitializedSBoxCount > maxSBoxCount)
    errAbort("maxSBoxCount is too small -- change and re-compile");
  for (i = 0; i < testBufferSizeInWords; i++)
    testInput[i] = 0; /* zero the input */
  for (i = 0; i < maxKeySize; i++)
    key[i] = i; /* set up a standard key */
  for (i = 0; i < 50; i++) {
    IV[0] = 0;
    IV[1] = 0;
    KhafreTwice (testInput, testOutput, testBufferSize, encryptDirection, IV, key, 2, 64);
    for (j = 0; j < testBufferSizeInWords; j++)
      testInput[j] = testOutput[j];
  };
  if ((testOutput[0] != 975165756) || (testOutput[1] != 1588976811) ||
     (testOutput[2] != 2837236962) || (testOutput[3] != 290364343)
     )
```

```
    errAbort ("Test encryption of Khafre failed");
  for (i = 0; i < 50; i++){
    IV[0] = 0;
    IV[1] = 0;
    KhafreTwice (testInput, testOutput, testBufferSize, decryptDirection, IV, key, 2, 64);
    for (j = 0; j < testBufferSizeInWords; j++)
      testInput[j] = testOutput[j];
  };
  if ((testOutput[0] != 0) || (testOutput[1] != 0) ||
    (testOutput[2] != 0) || (testOutput[3] != 0)
    )
    errAbort ("Test decryption failed");

};
/* Okay, we can encrypt at least 50 blocks correctly. */

/* Check the initial S box (the same as standardSBoxes[0]) */
checkInitialSBox ();

/* Now that the initial S box is known to be correct, check the rest
  of the standard S boxes, i.e., standardSBoxes[1],
  standardSBoxes[2], standardSBoxes[3], .... */
{
  unsigned long int randomBytes[16];
  int   i;
  int   row;

for (i = 0; i < 16; i++)
    randomBytes[i] = 0;
  sBoxesFromRandomArray (randomBytes, keySBoxes, auxKeys);
  for (i = 1; i < preInitializedSBoxCount; i++)
    for (row = 0; row < 256; row++){
      if (keySBoxes[i - 1][row] != standardSBoxes[i][row])
        errAbort ("re-computation of standard S boxes is in error");
    };
};
/* Now try testing Khufu to verify it can encrypt/decrypt different
  values */

{
  unsigned long int testInput[testKhufuBufferSizeInWords];
  unsigned long int testOutput[testKhufuBufferSizeInWords];
  unsigned long int key[maxKeySize];
  unsigned long int i;
  int   j;

if (maxKeySize < 16)
    errAbort ("maxKeySize too small");
  for (i = 0; i < testKhufuBufferSizeInWords; i++)
    testInput[i] = 0; /* zero the input */
  for (i = 0; i < maxKeySize; i++)
    key[i] = 0; /* set up a standard key */
  sBoxesFromRandomArray (key, keySBoxes, auxKeys);
  for (i = 0; i < 10; i++){
    IV[0] = 0;
```

```
      IV[1] = 0;
      Khufu (testInput, testOutput, testKhufuBufferSize, encryptDirection,
          IV, auxKeys, keySBoxes, 16);
      for (j = 0; j < testKhufuBufferSizeInWords; j++)
        testInput[j] = testOutput[j];
    };

if ((testOutput[0] != 556318067) || (testOutput[1] != 113379917) ||
     (testOutput[2] != 2856241156) || (testOutput[3] != 2619501619)
       )
      errAbort ("Test encryption of Khufu failed");

for (i = 0; i < 10; i++) {
      IV[0] = 0;
      IV[1] = 0;
      Khufu (testInput, testOutput, testKhufuBufferSize, decryptDirection,
          IV, auxKeys, keySBoxes, 16);
      for (j = 0; j < testKhufuBufferSizeInWords; j++)
        testInput[j] = testOutput[j];
    };
    if ((testOutput[0] != 0) || (testOutput[1] != 0) ||
      (testOutput[2] != 0) || (testOutput[3] != 0)
       )
      errAbort ("Test decryption of Khufu failed");

};

/* Check input arguments */
  /* the input format is: pharaoh <'khufu'|'khafre'>  <hex key>  [<E|D>
     [<decimal number of rounds>]] */ if (argc > 5)
    errAbort ("This routine accepts at most four arguments");
  if (argc == 5) {  /* pick up the decimal number of rounds */
    int  i;

numberOfRounds = 0;
    for (i = 0; argv[4][i] != 0; i++) {
      if (argv[4][i] < '0')
        errAbort ("Number of rounds must be in decimal digits");
      else if (argv[4][i] > '9')
        errAbort ("Number of rounds must be in decimal digits");
      numberOfRounds = 10 * numberOfRounds + (argv[4][i] - '0');
      if (numberOfRounds > 8 * preInitializedSBoxCount)
        errAbort ("Security parameter is too large");
    };
  };

if (argc > 3) {
    if ((argv[3][0] == 'E') | (argv[3][0] == 'e'))
      encryptionFlag = 1;
    else if ((argv[3][0] == 'D') | (argv[3][0] == 'd'))
      encryptionFlag = 0;
    else
      errAbort ("Third parameter must be 'e' for encrypt, or 'd' for decrypt");

forceIVtoZero = FALSE;
    if (argv[3][1] == '0') forceIVtoZero = TRUE;
```

```
      else
        if (argv[3][1] != 0)
          errAbort("Third parameter can only be one letter -- 'e' or 'd'");
    };

if (argc < 3)    /* No key, abort */
    errAbort("Usage: pharaoh <'khufu'|'khafre'> <hex key> [ <e|e0|d> [<decimal number of rounds>] ]");

/* Set the Khufu/Khafre flag properly */
  KhufuKhafreFlag = useKhufu;
  for (i = 0; i < 6; i++)
    if (argv[1][i] != khufuString[i])
      KhufuKhafreFlag = useKhafre;

if (KhufuKhafreFlag == useKhafre)
    for (i = 0; i < 7; i++)
      if (argv[1][i] != khafreString[i])
        errAbort("The first parameter must be 'khufu' or 'khafre'");

/* Pick up the key */
  { int   i;
    int   j;
    int   charLoc;
    int   moreHexDigitsFlag;

for (i = 0; i < maxKeySize; i++)
      key[i] = 0;
    moreHexDigitsFlag = 1;   /* there ARE more hex digits */
    charLoc = 0; /* start out at character 0 in the <hex key>
          parameter */
    for (i = 0; i < maxKeySize; i++)
      for (j = 0; j < 8; j++) {
        if (argv[2][charLoc] == 0)
          moreHexDigitsFlag = 0;   /* no more digits */
        if (moreHexDigitsFlag) {
          key[i] = key[i] * 16 + hexValueOf(argv[2][charLoc++]);
          keySize = i + 1;
        } else
          key[i] = key[i] * 16;
      };

/* bump 'keySize' up to the next even value -- it has to be
       2, 4, 6, 8, etc. */
    keySize += (keySize % 2);
    if (keySize > maxKeySize)
      errAbort("keySize too big -- set maxKeySize to desired value and recompile");
    if (keySize <= 0)
      errAbort("keySize smaller than 0, internal logic error");
    if (KhufuKhafreFlag == useKhafre)
      if ((numberOfRounds / 8 + 1) % (keySize / 2) != 0)
        errAbort("key size incompatible with number of rounds -- increase/decrease rounds");

};
```

```c
/* If we're using Khufu, we have to pre-compute the key S-boxes, and
   the auxilliary keys */
if (KhufuKhafreFlag == useKhufu)
    sBoxesFromRandomArray (key, keySBoxes, auxKeys);

/* Apply the encryption function to the standard input */ if (encryptionFlag) { if (forceIVtoZero == TRUE) {
        IV[0] = 0;
        IV[1] = 0;
        }
else
    generateIV (IV, key, keySize, auxKeys, keySBoxes, numberOfRounds);
convertLongToChar(IV,charIV,8);
if (write (outputFile, charIV, 8) != 8)   /* spit out the IV */
    errAbort("Error on write to output file");

byteCount = bufferSize;
bytesToWrite = bufferSize;

/* The main encryption loop */
while (byteCount == bufferSize) {
    /* simple algorithm -- read a buffer, encrypt it,
       write it out */ byteCount = read (inputFile, plainCharBuffer, bufferSize);
    if (byteCount == -1)
        byteCount = 0;   /* EOF encountered on read --
            that's okay */ if (byteCount < 0)
        errAbort ("Error on read from standard input");

if (byteCount != bufferSize)
        /* If we didn't read a full buffer, mark end
           of encrypted data by a '1' followed by all
           0's */
    {
        /* last time through -- don't need to process
           as much */
        bytesToWrite = 8 * (byteCount / 8 + 1);
        for (i = byteCount; i < bytesToWrite; i++)
            plainCharBuffer[i] = 0;  /* zero rest of buffer */
        plainCharBuffer[byteCount] = trailingOne;  /* put in trailing '1'
                bit (1000 0000) */
    };

/* Encrypt the plain buffer. */
    convertCharToLong(plainCharBuffer, plainWordBuffer,bufferSize);

if (KhufuKhafreFlag == useKhafre)
        Khafre (plainWordBuffer, cipherWordBuffer,
            bytesToWrite, encryptDirection,
            IV, key, 2, numberOfRounds);
```

```
    else
        Khufu (plainWordBuffer, cipherWordBuffer,
            bytesToWrite, encryptDirection,
            IV, auxKeys, keySBoxes, numberOfRounds);

/* write the buffer of encrypted data */
    convertLongToChar(cipherWordBuffer, cipherCharBuffer, bufferSize);
    if (write(outputFile, cipherCharBuffer, bytesToWrite) != bytesToWrite)
        errAbort("Error on write to output file");

/* and set up the IV for the next iteration of this
        loop (if there is one) */
    IV[0] = cipherWordBuffer[bufferSizeInWords - 2];
    IV[1] = cipherWordBuffer[bufferSizeInWords - 1];
    };
} else
    /* We are decrypting the binary from the standard input, and
        putting the plaintext on the standard output */
{
    /* read in the IV from the encrypted input */
    if (read (inputFile, charIV, 8) != 8)
        errAbort ("Error reading encrypted input data, or less than 8 bytes (too short)");
    convertCharToLong(charIV, IV, 8);

/* The following loop is slightly funny. It reads the NEXT
        buffer of cipher text, writes out the decrypted LAST
        buffer of plain text, and then decrypts the cipher text
        buffer into the plain text buffer. This structure
        essentially provides 'read ahead': when the plain text is
        written, I know if the next buffer read is empty, and
        therefore that I have to strip trailing '0' bits from this
        buffer of plain text before writing it out. Otherwise, if
        the ciphertext exactly filled the buffer, I might fail to
        strip off the trailing '0' bits (even though the next
        'read' would return 0 bytes, e.g., EOF). */ byteCount = bufferSize;
    bytesToWrite = 0;

/* The main decryption loop */
    while (byteCount != 0) {

/* read the next buffer */
        byteCount = read (inputFile, cipherCharBuffer, bufferSize);
        if (byteCount == -1)
            byteCount = 0;   /* EOF on read is okay */
        if (byteCount < 0)
            errAbort ("Error while reading data");
        convertCharToLong(cipherCharBuffer, cipherWordBuffer, bufferSize);

/* If the next buffer is empty then the old buffer
            has to have any trailing '0' bits stripped off */
        if (byteCount == 0) {
            /* strip off trailing 0's */
            while ((plainCharBuffer[bytesToWrite - 1] == 0) & (bytesToWrite > 0))
                bytesToWrite--;
            bytesToWrite--;
```

```
    if (plainCharBuffer[bytesToWrite] != trailingOne)
        errAbort(" Decryption format error");
};

/* Write out the old buffer */
if (bytesToWrite > 0)
    if (write (outputFile, plainCharBuffer, bytesToWrite) != bytesToWrite)
        errAbort("Error on write to output file");

/* now, decrypt the current ciphertext buffer */
if (KhufuKhafreFlag == useKhafre)
    Khafre (cipherWordBuffer, plainWordBuffer,
        byteCount, decryptDirection,
        IV, key, 2, numberOfRounds);
else
    Khufu (cipherWordBuffer, plainWordBuffer,
        byteCount, decryptDirection,
        IV, auxKeys, keySBoxes, numberOfRounds);

convertLongToChar(plainWordBuffer, plainCharBuffer, bufferSize);

/* remember the number of bytes decrypted, and hence
   to write out */
bytesToWrite = byteCount;

/* and set up the IV for the next iteration of this
   loop */
IV[0] = cipherWordBuffer[bufferSizeInWords - 2];
IV[1] = cipherWordBuffer[bufferSizeInWords - 1];

};

};

exit (0);
};
```

I claim:

1. A method for encrypting binary data, the binary data comprising 64-bit data blocks, the method comprising the steps of:
   splitting the 64-bit data block into a left 32-bit block and a right 32-bit block;
   using the left 32-bit block to access and retrieve a 32-bit number from a table containing 32-bit numbers, the table having been computed prior to the splitting step;
   exclusive-ORing the right 32-bit block with the 32-bit number obtained from the table;
   rotating the left 32-bit block according to a predefined rotation schedule;
   relabelling the rotated left 32-bit data block as the right 32-bit data block and relabelling the product of the exclusive-OR operation as the left 32-bit data block; and
   repeating the using, exclusive-ORing, rotating and relabelling steps until the binary data appears to be a random number.

2. The method of claim 1 wherein the repeating step is performed at least 15 times.

3. The method of claim 2 wherein the rotating and repeating steps insure that the table is only accessed once by every 8-bit unit in the 64-bit data block.

4. The method of claim 2 wherein a second, different table is used for supplying the number to the exclusive-OR step after the repeating step has been performed seven times.

5. The method of claim 1 wherein after the 64-bit data block is split, the left and right 32-bit blocks are exclusive-ORed with a first and second 32-bit auxiliary key binary number, the products of these exclusive-OR operations being relabelled the right and left 32-bit blocks.

6. The method of claim 5 wherein after the final repeat step has been performed, the final right and left 32-bit data blocks are exclusive-ORed respectively with a third and fourth auxiliary key binary number, the results of these two exclusive-OR operations being concatenated together to produce a final 64-bit encrypted output number.

7. The method of claim 1 wherein the rotation of the left 32-bit data block is accomplished by using SHIFT instructions.

8. The method of claim 1 wherein the rotation of the left 32-bit data block is accomplished by using ROTATE instructions.

9. The method of claim 1 wherein the table is computed by the steps of
generating a stream of pseudo-random bytes; and
using the stream of pseudo-random bytes to generate four pseudo-random permutations that map 8 bits to 8 bits.

10. The method of claim 9 wherein the permutations are generated by using a known algorithm for producing pseudo-random permutations.

11. The method of claim 9 wherein a predefined table is used to generate the stream of pseudo-random bytes.

12. A method for encrypting binary data, the binary data comprising 64-bit data blocks, the method comprising the steps of:
splitting the 64-bit data block into a left 32-bit block and a right 32-bit block;
using the left 32-bit block to access and retrieve a 32-bit number from a table containing 256 32-bit numbers;
exclusive-ORing the right 32-bit block with the 32-bit number obtained from the table;
rotating the left 32-bit block according to a predefined rotation schedule;
relabelling the rotated left 32-bit data block as the right 32-bit data block and relabelling the product of the exclusive-OR operation as the left 32-bit data block; and
repeating the using, exclusive-ORing, rotating said relabelling steps until the binary data appears to be a random number.

13. The method of claim 12 wherein the table comprises four columns and 256 rows, each entry in the rows being 8-bits wide.

14. The method of claim 13 wherein all four of the 8-bit columns are permutations of one another.

15. The method of claim 14 wherein the selection of a different number in the table changes all four 8-bit numbers generated by the table.

16. The method of claim 12 wherein after the 64-bit data block is split, the left and right 32-bit blocks are exclusive-ORed with a first and second 32-bit auxiliary key binary number, the products of these exclusive-OR operations being relabelled the right and left 32-bit blocks.

17. The method of claim 16 wherein after the final repeat step has been performed, the final right and left 32-bit data blocks are exclusive-ORed respectively with a third and fourth auxiliary key binary number, the results of these two exclusive-OR operations being concatenated together to produce a final 64-bit encrypted output number.

18. A method for encrypting data, the data comprising 64-bit data blocks, the method comprising the steps of:
calculating, prior to the start of data encryption, a standard table of pseudo-random permutations;
selecting a user-defined key;
first exclusive-ORing of the 64-bit data block with the key;
splitting the product of the first exclusive-ORing into a left and right 32-bit half;
using the left 32-bit half as an index to access the standard table and retrieve a 32-bit pseudo-random number;
second exclusive-ORing the right 32-bit half with the 32-bit pseudo-random number;
relabelling the product of the second exclusive-ORing of the right half and the 32-bit pseudo-random number as the left 32-bit half;
rotating the left 32-bit half according to a predefined schedule;
relabelling the left 32-bit half as the right 32-bit half after the rotation;
first repeating the steps of using, second exclusive-ORing, relabelling, rotating and relabelling a predefined number of times; and
repeating the first exclusive-ORing step prior to the first repeating step every eighth time the first repeating step is performed.

19. A method for encrypting binary data, the binary data comprising 64-bit data blocks, the method comprising the steps of:
splitting the 64-bit data block into a left 32-bit block and a right 32-bit block;
using the left 32-bit block to access and retrieve a 32-bit number from a table containing 32-bit numbers, the table being computed using a user-supplied key;
exclusive-ORing the right 32-bit block with the 32-bit number obtained from the table;
rotating the left 32-bit block according to a predefined rotation schedule;
relabelling the rotated left 32-bit data block as the right 32-bit data block and relabelling the product of the exclusive-OR operation as the left 32-bit data block; and
repeating the using; exclusive-ORing, rotating and relabelling steps until the binary data appears to be a random number.

20. The method of claim 19 wherein after the 64-bit data block is split, the left and right 32-bit blocks are exclusive-ORed with a first and second 32-bit auxiliary key binary number, the products of these exclusive-O R operations being relabelled the right and left 32-bit blocks.

21. The method of claim 20 wherein after the final step has been performed, the final right and left 32-bit data blocks are exclusive-ORed respectively with a third and fourth auxiliary key binary number, the results of these two exclusive-OR operations being concatenated together to produce a final 64-bit encrypted output number.

22. A method for encrypting binary data, the binary data comprising N-bit data blocks, the method comprising the steps of:
splitting the N-bit data block into a left N/2-bit block and a right N/2-bit block;
using the left N/2-bit block to access and retrieve a N/2-bit number from a table containing N/2-bit numbers, the table having been computed prior to the splitting step;
exclusive OR-ing the right N/2-bit block with the N/2-bit number obtained from the table;
rotating the left N/2-bit block according to a predefined rotation schedule;
relabelling the rotated left N/2-bit data block as the right N/2-bit data block and relabelling the product of the exclusive-OR operation as the left N/2-bit data block; and
repeating the using, exclusive-ORing, rotating and relabelling steps until the binary data appears to be a random number.

23. The method of claim 22 wherein after the N/2-bit data block is split, the left and right N/2-bit blocks are exclusive-ORed with a first and second N/2-bit auxiliary key binary number, the products of these exclusive- O R operations being relabelled the right and left N/2-bit blocks.

24. The method of claim 23 wherein after the final repeat step has been performed, the final right and left N/2-bit data blocks are exclusive-ORed respectively with a third and fourth auxiliary key binary number, the results of these exclusive-OR operations being concatenated together to produce a final N-bit encrypted output number.

25. A method for encrypting binary data, the binary data comprising 64-bit data blocks, the method comprising the steps of:
   splitting the 64-bit data block into a left 32-bit block and a right 32-bit block;
   using the left 32-bit block to access and retrieve a 32-bit number from a table containing 32-bit numbers, the table having been computed prior to the splitting step;
   reversibly mixing the right 32-bit block with the 32-bit number obtained from the table;
   rotating the left 32-bit block according to a predefined rotation schedule;
   relabelling the rotated left 32-bit data block as the right 32-bit data block and relabelling the product of the mixing operation as the left 32-bit data block; and
   repeating the using, mixing, rotating and relabelling steps until the binary data appears to be a random number.

26. The method of claim 25 wherein the reversibly mixing step comprises an integer addition of the right 32-bit block and the 32-bit number.

27. The method of claim 25 wherein the reversibly mixing step comprises an integer subtraction of the right 32-bit block and the 32-bit number.

* * * * *